United States Patent [19]

Carlson et al.

[11] 4,226,900

[45] Oct. 7, 1980

[54] MANUFACTURE OF HIGH DENSITY, HIGH STRENGTH ISOTROPIC GRAPHITE

[75] Inventors: Robert K. Carlson, Decatur, Tex.; James J. Ferritto, Saginaw, Mich.

[73] Assignee: Union Oil Company of California, Los Angeles, Calif.

[21] Appl. No.: 883,227

[22] Filed: Mar. 3, 1978

[51] Int. Cl.$^2$ .............................................. B05D 3/02
[52] U.S. Cl. .................................. 427/228; 264/29.5; 427/227; 427/294; 427/369; 427/370; 427/379; 427/385.5
[58] Field of Search ................... 427/227, 331, 385 R, 427/294, 369, 370, 379, 228; 264/29.5; 428/408

[56] References Cited

U.S. PATENT DOCUMENTS

| | | | |
|---|---|---|---|
| 2,683,107 | 7/1954 | Juel | 264/29.5 |
| 3,026,214 | 3/1962 | Boyland et al. | 427/228 |
| 3,102,047 | 8/1963 | Rivington | 427/228 |
| 3,462,289 | 8/1969 | Rohl et al. | 264/29.5 |
| 3,517,092 | 6/1970 | Peterson | 264/29.5 |
| 3,682,686 | 8/1972 | Nakamura et al. | 427/228 |

*Primary Examiner*—John D. Smith
*Assistant Examiner*—Janyce A. Bell
*Attorney, Agent, or Firm*—Dean Sandford; Michael H. Laird

[57] ABSTRACT

Methods of producing high density, high strength, homogeneous graphite articles having densities of 2 or more and isotropic ratios of about 1.05 or less are disclosed. These methods achieve densification to levels above 2 g/cc yet take greatest advantage of increases in all structural properties and maintain isotropic quality. They involve impregnation of pre-formed isotropic graphite substrates of high density, having an isotropic ratio of 1.05 or less, 15 to 35 percent total porosity of which at least 50 percent is interconnected and open to the surface, average pore diameters of 1.5 to 5 microns, and narrow pore size distributions. A vacuum is drawn on the substrate after which it is contacted with highly fluid impregnant such as petroleum or coal tar pitch and then carbonized, baked and graphitized under conditions correlated to increase density without detectably modifying graphite matrix structure. This variable correlation assures maximum strength increase commensurate with density increase and avoids degradation of desirable properties such as isotropic ratio.

7 Claims, 3 Drawing Figures

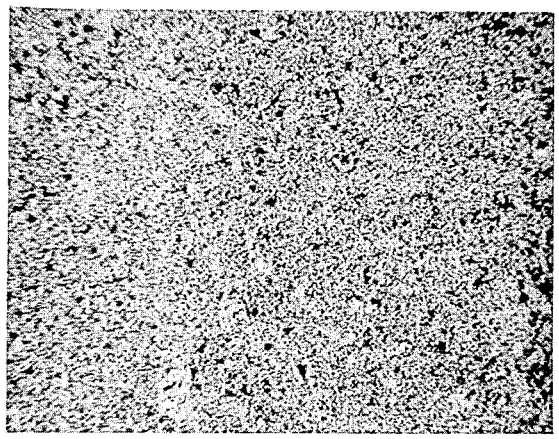
FIGURE II-A
GRAPHITE STRUCTURE UNIMPREGNATED
APPARENT DENSITY 1.68 GM/CC
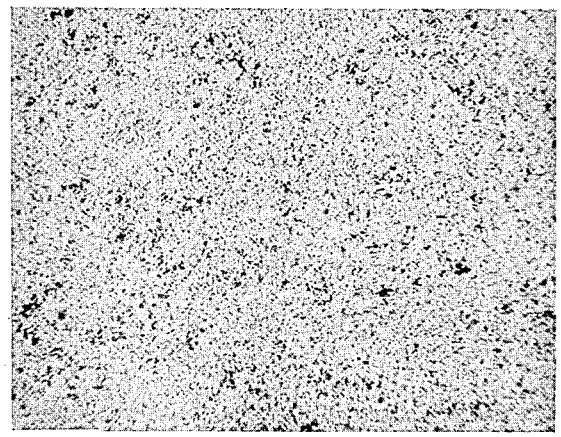
FIGURE II-B
DENSIFIED GRAPHITE STRUCTURE
APPARENT DENSITY 2.10 GM/CC

MANUFACTURE OF HIGH DENSITY, HIGH STRENGTH ISOTROPIC GRAPHITE

BACKGROUND OF THE INVENTION

Graphite densification can be used to improve several properties of synthetic polycrystalline graphite. Density increase by itself is desirable in some instances. In other cases it is preferable to also enhance other physical properties such as compressive, flexural and tensile strengths. The theoretical graphite density of 2.26 has not been achieved in synthetic graphite articles. However, apparent densities of 2 and slightly higher have been obtained by densification.

A variety of such techniques are known in the art. These generally involve impregnation and high temperature isostatic pressing of a graphitized pre-form, i.e., substrate. While these processes significantly increase density, they do not achieve the greatest possible increase in structural strength. This appears to be due to a combination of graphite feed properties and process conditions.

It is therefore one object of this invention to provide an improved graphite densification process. Another object is the provision of a process for increasing the density of synthetic polycrystalline graphites while obtaining optimum increases in other structural properties such as compressive, tensile and flexural strengths. Another object is a provision of an improved graphite densification method that accomplishes the required density increase without degrading desirable properties such as crystal or pore structure and/or isotropic ratio. Another object is the provision of a method for densifying synthetic polycrystalline graphite and obtaining the most desirable physical strength and isotropic quality. Another object is the provision of a method for obtaining formed graphite articles having densities above 2 by a combination of impregnation and graphitization in a minimum number of impregnating cycles.

FIGS. 2a and 2b are photomicrographs of a densified graphite article produced by the methods of this invention magnified 100 diameters.

Figure 1:
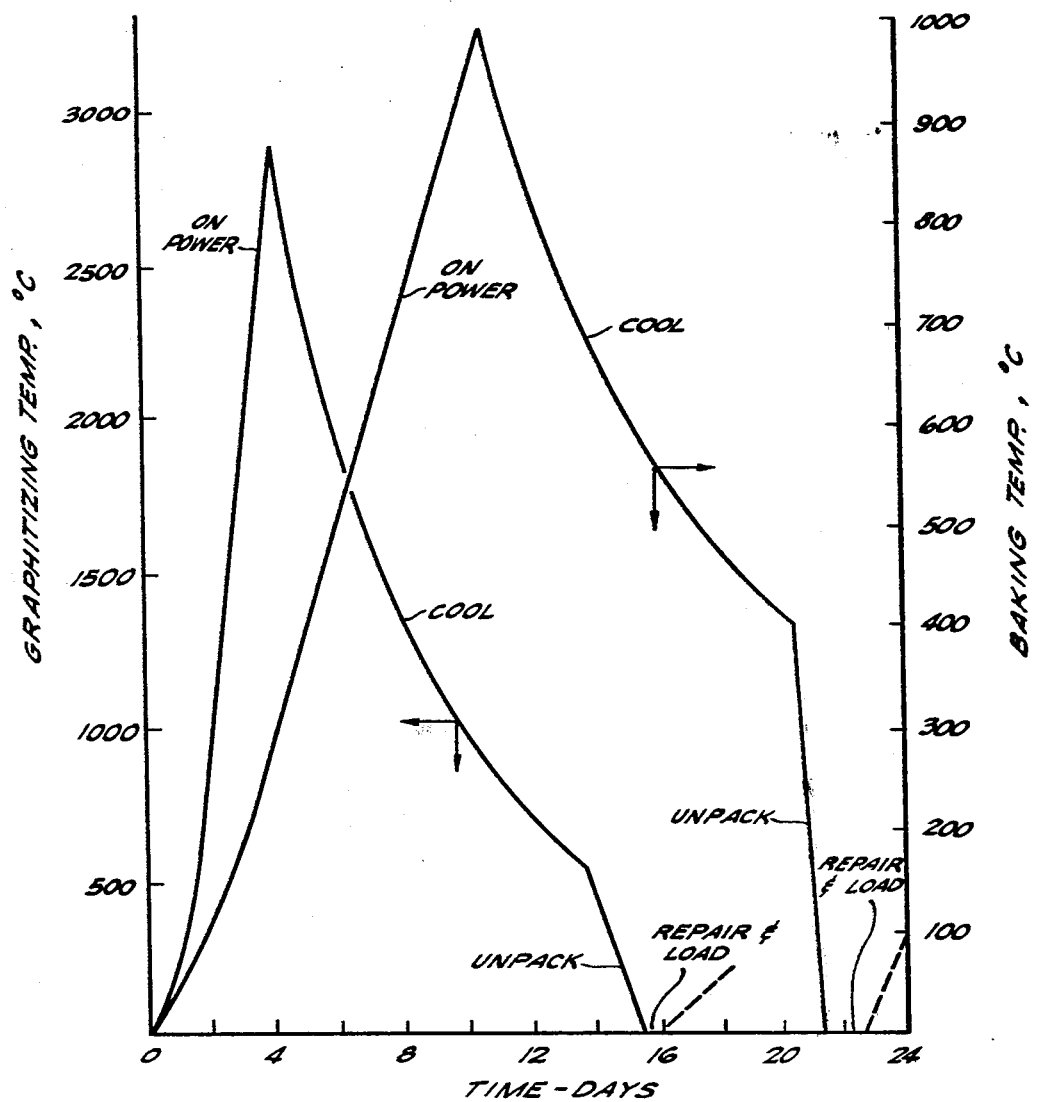
FIG. 1 shows the time-temperature sequences for typical baking (right-hand margin) and graphitizing cycles (left-hand margin).

These methods are capable of producing homogeneous, isotropic graphite articles having densities of at least about 2 g/cc, compressive strengths of at least about 20,000 psi, preferably at least 25,000 or 30,000 psi, flexural strengths of at least about 8,000, preferably at least 10,000 psi, tensile strengths of at least about 10,000 psi, and isotropic ratios of about 1.05 or less. In this process, pre-formed, synthetic polycrystalline graphite substrates of high open porosity are impregnated, carbonized, baked and graphitized in one or more cycles at temperatures and pressures correlated to obtain the required density increase and minimize degradation of graphite structure and isotropic quality.

We have found that these objectives require careful selection of graphite feedstocks and correlation of pressures and temperatures in both the carbonizing, baking and graphitizing steps. This is not to say that one or more of the stated objectives cannot be accomplished by other processes. Several known processes are capable of producing graphites having densities of 2 or slightly higher. Illustrative are the HIP (hot isostatic pressing), pressure baking and HIPC (hot isostatic pressing-carbonization) processes. These processes are discussed in the literature, for example in Peterson, U.S. Pat. No. 3,517,092, and in journals such as *Nuclear Graphite,* Dragon Project Symposium published by the Organization for European Economic Cooperation, European Nuclear Energy Agency, July, 1961. While these processes can achieve reasonably high densities, they do so with a combination of high pressures and temperatures that do not yield the best isotropic ratio or compressive, flexural and tensile strengths.

The graphite substrates of this invention are pre-formed, homogeneous, isotropic, synthetic polycrystalline graphites of specific porosity and pore size distribution. They are isotropic in all structural respects in that they exhibit little (less than 5 percent) dimensional variation in strength, or electrical and thermal conductivity. This property is defined by isotropic ratio which, for the purpose of this invention, should be about 1.05 or less, preferably about 1.03 or less. For the purposes of this disclosure, isotropic ratio is expressed as the ratio of electrical resistivity values along two of the possible three dimensional axes. The substrate should have relatively high density on the order of about 1.6 to about 1.95, preferably about 1.75 to about 1.95 g/cc and correspondingly low porosity, i.e., less than about 35, generally about 15 to about 35 and preferably about 25 to about 35 percent. Of particular importance is the amount of porosity which is continuous, i.e., interconnected, and in communication with the surface. This available porosity is available to impregnation without modifying matrix structure as hereinafter described.

We have found that the impregnating, carbonizing, baking and graphitizing cycle hereinafter detailed is particularly applicable to a certain class of graphites in which at least 50%, usually at least 60%, and preferably at least 70% of the porosity is available. The amount of open porosity and initial substrate density must be sufficient to attain the objective 2 g/cc product density within the process limitations hereinafter defined. For example, we have found that 2 g/cc product density can be achieved with an impregnant having 85% carbon residue (under carbonizing conditions) in one step with a 1.80 g/cc substrate in which 70% of the total porosity is open with an impregnation-carbonizing pressure of 15,000 psi. (Illustrative carbonizing, baking and graphitizing temperature cycles are discussed in the examples hereinafter.) In contrast, under similar conditions, e.g., a carbonizing pressure of 15,000 psi and 85% carbon residue impregnant, the target density of 2.0 g/cc can be achieved with a 1.85 g/cc substrate having 60% open porosity. Similarly, only about 50% open porosity is required to obtain the target density with a substrate having an initial density of 1.90 g/cc.

The substrates are further characterized by uniform, fine-pore structure (average pore diameters on the order of about 0.5 to about 5 microns) and relatively narrow pore and particle size distributions. Typically, 90% of the available pore volume is contained in pores having diameters less than about 20, usually less than about 10 and preferably less than about 5 microns. Matrix particles are preferably substantially spherical having average diameters usually below 10 microns, preferably from 1 to 5 microns.

The substrates are composed essentially of synthetic polycrystalline graphite, preferably at least 98% of the carbon is contained in the crystalline graphite matrix. Such graphites are commercially available from Poco Graphite, Inc., P.O. Box 2121, Decatur, Texas, 76234, for instance, as grades AXM, AXF, AXT and EDM-2 and -3. Typical specifications for one substrate within this classification—Poco AXT—are given in the following Table.

Table 1

| Poco Graphite Grade AXT | |
|---|---|
| Average Particle Size | 2 Microns |
| Average Pore Diameter | 1.1 Microns |
| Apparent Density | 1.68 g/cc |
| Compressive Strength | 14,000 Psi |
| Flexural Strength | 6,000 Psi |
| Electrical Resistivity | 9.1 (ohm-inch $\times 10^{-4}$) |
| Coefficient of Thermal Expansion | 7.5 (Room Temp. to 1000° C. $\times 10^{-6}$ inch/inch/°C. |
| Shore Hardness | 67 |

In addition to the properties discussed above, these substrates preferably have the following characteristics to assure the greatest gain in structural properties. They should have at least 15% porosity, but not more than 35%, of which at least 50% is open as described above. They should have densities of at least about 1.6, compressive strengths of at least about 9,000 psi, flexural strengths of at least about 6,000 psi, and tensile strengths of at least about 6,500 psi.

The substrate can be formed or machined in any desired shape. However, article thickness will influence impregnation efficiency with a given combination of impregnant, pressure, temperature, time and number of cycles. The examples, infra, illustrate conditions capable of accomplishing our objectives with articles of a certain size. Comparable impregnation efficiencies can be obtained with larger articles by reducing impregnant viscosity, increasing impregnation pressure (within the limits described herein), prolonging impregnation time, using a longer heating cycle, at least during the early stages of the pressure carbonizing step, or any combination of these. Eight-inch minimum diameter substrates have been successfully densified by these methods. Larger substrates could be handled in larger pressure carbonizing equipment.

In accordance with a presently preferred embodiment, the article is placed in a pressure container such as a pressure autoclave capable of withstanding process temperatures and pressures. A vacuum is then applied sufficient to remove a majority of the gas from the article's interior. The pressure should be reduced to a level of less than 100, usually less than 50, and preferably to less than 10 mm of mercury, and held at that level for at least 3 minutes to assure adequate evacuation. Evacuation can be accelerated by either reducing pressure or increasing substrate temperature, e.g., to 200° F. or higher if desired.

The impregnant is then quickly admitted to the pressure container at a temperature of at least about 20° C., preferably at least 50° C. above its melting point to assure low viscosity. The impregnant charge should be sufficient to completely cover the article and assure adequate impregnation. Remaining vacuum, if any, is then released and the article is carbonized to convert the impregnant to carbon residue.

It should be understood that this process offers considerable flexibility for varying the respective temperature-pressure relationships during each step and in the transitions between impregnation, carbonizing, baking and graphitizing steps. The process can be controlled to provide a distinct line of demarcation between any two or all of these steps. On the other hand, any one step such as impregnation can be phased into the next step (carbonizing) by gradual variation of temperatures and pressures. Carbonizing, baking and graphitizing can be conducted in series without removing the substrate from the apparatus. For the sake of simplicity, all steps of the cycle are referred to hereinafter as the impregnating-graphitizing cycle which comprehends all variations of the processing sequence.

Similarly, other modifications of each step in the sequence can be made to improve results. Thus a substrate impregnated as described immediately above can be subjected to an elevated pressure, e.g., 100 to 300 psi for some period of time, e.g., 1 to 2 hours prior to heating, to drive the impregnant completely through the article. In fact, such procedures are preferred, particularly for articles having larger minimum cross-sections. Obviously, slightly elevated temperatures, e.g., 200°–300° F. can be maintained at this phase to assure maintenance of low impregnant viscosity.

The impregnants are materials generally well known in the art having relatively low melting points, well below impregnating temperature, and high carbon values. Typically, they include petroleum and coal tar pitches and resins such as phenolic resins, e.g., phenol-formaldehyde resins, furfural alcohol resins, etc., having melting points of about 200° C. or less, carbon/hydrogen atom ratios of at least about 1.6, preferably at least about 1.65, carbon residue values of at least about 60%, and preferably at least about 70% under the carbonizing temperatures and pressures described herein.

The petroleum and coal tar pitches preferably contain less than 20, usually less than 10 weight percent benzene insolubles. Benzene insolubles are very fine suspended particles which will not intrude the fine pores of these substrates and tend to plug the article surface. This result can be minimized by using impregnants containing little or no benzene insolubles.

The examples discussed hereinafter illustrate that the synthetic resins also effectively increase density and article strength. However, they are not completely convertible to graphite during the graphitizing step. Thus the petroleum and coal tar pitches should be used when essentially pure graphite articles are required. Nevertheless, the resins are essentially completely carbonizable and are comprehended by the broadest, albeit less preferred, embodiments of this invention.

The viscosity of either the pitch or resin impregnants can be reduced with minor amounts of either carbonizable or vaporizable solvents. Benzene or other aromatics such as xylenes and toluene are suitable solvents for either the petroleum or coal tar pitches. Minor amounts, e.g., 5 to 10 percent, of these solvents produce substantial viscosity reduction.

The resin impregnants have the advantage that they can be formed in situ. Thus the article can be impregnated with the monomers premixed with a relatively stable catalyst which polymerize within the pores. For instance, the substrate can be impregnated with a mixture of phenol and formaldehyde containing about 0.5 to about 5.0 weight percent of an anhydride catalyst which promotes rapid polymerization only at elevated temperatures. Such mixtures are relatively stable at room temperatures but will polymerize rapidly at temperatures above 150° C. When using this approach it is preferable to reach the maximum impregnating pressure before substantial polymerization takes place, i.e., before that temperature is reached at which the catalyst becomes active.

In the carbonizing step, the substrate is subjected to pressures of at least 5,000, usually at least 10,000, and preferably at least 15,000 psi to assure adequate permeation of the impregnant throughout the article and increase carbon residue. In an alternative embodiment, however, atmospheric or low pressure, e.g., less than 500 psi, carbonizing can be used in the first of a multicycle process. In any event, these pressures should not exceed 30,000 psi and are preferably maintained below 25,000 psi to avoid any degradation, e.g., fracturing or rearrangement of the crystal matrix or pore structure such as by "hot working". Such structural modifications occur at excessive impregnating, carbonizing, baking or graphitizing pressures and result in an article having a higher isotropic ratio and lower physical properties than would otherwise be obtained.

Previous investigators have used higher pressures and/or higher temperatures in one or more process stages to improve densification. We have found that the density increase achieved by such high pressure does not offset the loss of final strength values and isotropic quality. Even at relatively high temperatures where the impregnant viscosity is very low, high differential pressures can exist within the article interior. These differentials may exist across the barriers between open and closed porosity or at the juncture of large and small pores. In either case, pressures can be increased to the point where these blockages are broken, whereupon the impregnant will enter other areas of the article, i.e., previously closed porosity. While this factor obviously results in some, albeit minor, increase in density over that otherwise obtainable at the lower pressures described herein, that increase is obtained at the expense of ultimate strength. Adequate results are usually realized at pressures within the range of about 15,000 to about 20,000 psi.

Temperature should be correlated with pressures at this stage of the process; it should not exceed 1800° C. during the carbonizing step, i.e., while the article is exposed to any significant pressure.

Significant pressures at temperatures of 1800° C. reorder matrix structure which, as pointed out above, increases isotropic ratio and can reduce product strength. This effect is a function of temperature and pressure. It is also time variant. More structural rearrangement occurs the longer the substrate is exposed to elevated temperature and pressure. Those changes also occur more rapidly at either higher temperature or higher pressure. However, during the earlier stages of the carbonizing cycle at which the article temperature is well below 1800° C., elevated pressure improve carbonizing efficiency.

In these respects also this process distinguishes from the HIP (hot isostatic pressing), HIPC (hot isostatic pressing-carbonization) and "hot working" or "recrystallizing" (ZTS) processes. In the extreme, all of those procedures are similar in that they obtain marginal increases in product density by collapsing, reordering and/or recrystallizing the original graphite structure. We have found that acceptable densities of 2 or above can be achieved with the starting materials described hereinabove without the necessity of rearranging or destroying the crystalline matrix or pore structure. Consequent losses in structural integrity are thereby avoided or at least minimized.

The combination of initial pressure, i.e., the prevailing pressure during the heatup period of the carbonizing cycle, correlated with temperature, should be sufficient to impregnate at least about 80, usually at least about 90, and preferably at least about 95% of the then available open porosity. Impregnating and carbonizing efficiencies improve at higher pressure, therefore the article is preferably exposed to a pressure of at least about 5000 psi for a gradual heatup period of at least about 30 minutes in which the article is brought to incipient carbonizing temperatures, e.g., about 400° C. Final carbonizing temperatures should be at least about 420° C., usually between 450° and 1200° C., and preferably between about 600° and about 1000° C.

Gradual heatup rates are preferred to promote efficient carbonization and prevent damage to the graphite matrix. Thus, heating rates should be at least about 5° C. per hour but less than about 200° C. per hour during the carbonizing cycle. Substantial pressure can be applied at or before the time incipient carbonizing temperatures are reached. Thus pressures of at least 5000, usually at least 10,000 psi are often applied either before or when the article reaches temperatures of 200° C.

Taking this correlation of temperature and pressure into account, the substrate should be gradually heated to the carbonizing temperature and maintained at or above an adequate temperature for a period sufficient to obtain the desired carbonizing efficiency, e.g., carbonize at least 50% of the impregnant within the pores. The best results are usually obtained with carbonizing cycles of at least about 10, preferably at least about 24 hours.

The carbonized article is then baked under conditions of temperature and time sufficient to coke the carbonaceous impregnant residue. A typical baking cycle is illustrated by the right hand curve in FIG. 1. As shown in this illustrative case, the carbonized substrate is heated at a relatively constant rate from ambient temperature to 1000° C. in approximately 11 days. At that point furnace power is discontinued and the article is cooled to approximately 400° C. which, in the apparatus there involved, required an additional 10 days. Baking temperatures are usually at least about 800° C., preferably 900° to 1800° C. Baking rate is a function of article time at temperature, thus the duration of the baking cycle is determined, in large part, by heating rate, article geometry and maximum baking temperature. Typical baking cycles are usually at least about 5 days although the carbonized articles are preferably maintained at a temperature of about 400° C. for at least about 7 days and at a temperature above 800° C. for at least 24 hours.

Before or after the baking cycle, and preferably before the graphitizing step, the article is removed from the apparatus and scraped to remove excess surface carbon deposited by excess impregnant. This procedure maintains the desired shape of the preform and, if accomplished by mild machining or abrasion, maintains the desired openness of the surface porosity for subsequent impregnation cycles, if any.

An alternative, although less preferred embodiment, that avoids the need for excess coke removal after the carbonizing or baking steps, involves removing excess impregnant from the substrate surface prior to carbonizing. In this embodiment the article can be cleaned of excess impregnant prior to the carbonizing step of the first cycle and then maintained in the presence of excess impregnant under pressure during the carbonizing step of the second and/or subsequent cycles.

Graphitizing involves heating to at least 2400° C., preferably at least 2500° C., and usually from 2600° to 3000° C. The baked piece is usually maintained at a temperature above 2400° C. for at least one-half hour. Graphitization efficiency is a function of both temperature and the time at temperature. Conversion is more rapid at the higher temperatures; thus, less time is required to obtain complete graphitization at the higher temperatures.

During the graphitizing step, the piece should not be exposed to any substantial pressure at temperatures of 2000° C. or higher. This precaution is taken to avoid modification of the original substrate graphite structure with consequent reduction in ultimate strength and increased isotropic ratio. The exact temperature-pressure correlation required to prevent such restructuring can be determined by subjecting several pieces of the desired substrate to different pressure-temperature sequences, i.e., pressures of 100, 500 and 800 psi at temperatures of 1800°, 1900° C., etc., and determining at what point a detectable variation in isotropic ratio occurs. Pressures and temperatures capable of significantly changing isotropic ratio are preferably avoided.

Excessive pressures and temperatures have been used by the prior art to promote densification by "hot working". However, such conditions achieve densification at the expense of matrix structure, strength and isotropic ratio. This is not to say that the product will not have higher compressive, tensile strength, etc., than the initial piece. However, the strength values will not be as high as they might otherwise have been if the procedures described herein were observed.

Thus, in accordance with this invention, the article should not be exposed to any substantial pressure, e.g., above 100 psi, at any temperature above 1800° C. Usually there is no advantage to maintaining any pressure during graphitization; atmospheric pressure is generally used. This contrasts to the carbonizing cycle in which it is usually preferable to maintain a very high pressure, at least at temperatures well below 1800° C., to improve impregnation and increase impregnant carbonization.

Heating rate control is also important to avoid fracturing by thermal expansion or expansion of trapped or volatilized gas. Thus the article should be heated at a rate of about 500° C. per hour or less, preferably less than about 200° and usually less than about 100° C. per hour.

A typical graphitizing cycle is illustrated in FIG. 1. Graphitizing temperatures are indicated on the lefthand margin. In this illustrative cycle the baked article was heated from ambient temperature at a relatively constant rate of approximately 60° C. per hour to a temperature of about 2900° C. in about 4 days. The article was then cooled in the furnace for an additional 10 days during which the temperature gradually dropped to about 600° C.

Depending on the properties desired, the product can be recovered as such or can be subjected to one or two additional cycles. However, process conditions should be selected that will assure the desired product properties within three total cycles, preferably within two cycles or less.

We have found that if the desired density and strength increases are not achieved within three cycles, little incremental improvement is obtained with continued treatment. Without being limited by any particular theory or explanation, this result may be due to the small, uniform pore size of the preformed graphite feed. While the substrates of this invention have the advantage of a large percentage of open porosity, that porosity is available only in relatively small pores which become significantly smaller or even close completely within several impregnating steps.

Our methods can produce graphite products having densities above 2 grams per cc, very high strength values in all respects and low isotropic ratios of 1.05 or less in a single cycle under appropriate circumstances. This can be achieved with substrates having densities of at least about 1.80 g/cc; the impregnant should have a carbon residue value (under the selected carbonizing conditions) of at least about 60%. Impregnating-carbonizing conditions should be sufficient to occupy at least about 80%, preferably at least about 90% or more of the open porosity with impregnant in a single cycle. Within these limitations, densities of 2.0 g/cc can be reached with impregnating-carbonizing pressures of 15,000 psi, substrates having initial densities of 1.80 g/cc and 70% open porosity, and impregnants having 85% carbon residue values under carbonizing conditions. Densities of 2.0 or greater can be achieved with similar impregnants and pressures using 1.85 g/cc substrates and 60% open porosity (60% of the total porosity is open). Lower percentages of open porosity, e.g., 50%, are required to obtain 2.0 g/cc product with 1.90 g/cc substrates.

Density and strength increases are attributable primarily to the conditions employed in the first two steps of the cycle, i.e., the impregnation and carbonizing steps. This of course assumes that the graphitizing conditions are sufficient to graphitize essentially all the carbon deposited during the carbonizing step (in the case where graphitizable impregnants are employed, e.g., petroleum and coal tar pitches).

Higher impregnation and carbonizing temperatures and pressures toward the upper end of the described ranges facilitate greater density and strength increases with each cycle. Care must be taken, however, to observe the stated maximum temperature-pressure limitations to avoid reordering or collapsing the matrix structure. More gradual heatup rates, i.e., on the order of 40° C. per hour or less during the carbonizing cycle, higher ultimate impregnation pressures and temperatures, and higher initial carbonizing and graphitizing pressures also facilitate overall quality improvement.

Substrate and product properties referred to in the aforegoing disclosure and the following examples were evaluated by conventional analytical procedures. Apparent density was determined by ASTM standard C-559-69. Total porosity was determined by density difference between theoretical maximum and apparent density. Although the reported theoretical maximum for graphite is 2.26 grams per cc, that value of skeletal density is seldom reached in practice. In our experience, the high density substrates referred to herein have skeletal densities closer to 2.22 grams per cc. Accordingly, the latter value was used to obtain total porosity by comparison to apparent density.

Open (as opposed to total) porosity was determined by conventional mercury porosimetry at 15,000 psi. Coefficient of thermal expansion was determined by ASTM standard E-228-66aT. Compressive strengths are conventionally determined by ASTM standard E-9-67 and E-4-67.

Electrical resistivity (used herein and conventionally to establish isotropic ratio) was evaluated by the procedures defined in ASTM C-611-69 using eight contact points (four more than called for in the ASTM specification). This procedure enabled the analyst to average readings between two perpendicular sides of the test piece—a procedure particularly adaptable to the graphite substrates and products here involved due to their very low isotropic ratio. In other words, to accurately evaluate isotropic ratio, electrical resistivity should be determined along all three major axes. However, due to the low isotropic ratio of these materials, it makes no difference which two axes are chosen since neither the feed substrates nor products have a conventional graphite grain structure common to other materials. This of course is true only if the precautions prescribed herein are accurately followed to avoid disrupting internal structure or otherwise arranging the original graphite matrix by excessive pressure or any significant pressure at elevated temperatures, e.g., 1800° C. or above.

Flexural strength is determined by the procedures defined in ASTM standard D-790-66 with the exception that our method involved 4 point loading. Tensile strength values were determined in accordance with ASTM standard C-505-65T.

The following examples illustrate the concepts of this invention. They should be considered only for that purpose and not as limiting the scope of this invention otherwise than as set out hereinabove.

EXAMPLE 1

The substrate was a rectangular, machined graphite preform 2"×4"×6" having the following characteristics:
Average particle size: 2 microns
Average pore diameter: 1.1 microns
Apparent density: 1.68 g/cc
Compressive strength: 14,000 psi
Flexural strength: 6,000 psi
Electrical resistivity: 9.1 (ohm-inch×$10^{-4}$)
Coefficient of thermal expansion: 7.5 (Room temp. to 1000° C.)×$10^{-6}$ inch/inch/°C.
Shore Hardness: 67
Isotropic ratio: 1.03

This material had a total porosity of 25.6 percent and an open porosity of 24.3 percent (95 percent of the total). It is available from Poco Graphite, Inc., Grade AXT, at the address given above. The substrate or article was placed in a stainless steel container inside a vacuum autoclave and a vacuum of 20 torr (20 mm mercury) was held on the autoclave for 2 hours. Hot Ashland 240 petroleum pitch was then quickly introduced into the container at a temperature of 225° C. in an amount sufficient to cover the piece. The autoclave was then brought to atmospheric pressure and the container and preform were removed and cooled.

A stainless steel top was then braised onto the can and a vacuum of 20 torr was pulled on the contents through a ¼-inch copper tube in the container top. After one-half hour under vacuum the copper tube was sealed and the closed container was placed in a cold wall, high pressure autoclave and pressure carbonized as follows.

A pressure of 300 psi was applied until the temperature of 200° C. was reached and was then raised rapidly with temperature at a rate sufficient to reach a pressure of 15,000 psi at 290° C. Temperature was then raised to 700° C. at constant pressure. The unit was cooled and the can was opened and the substrate was scraped to remove excess coke.

The thus carbonized article was then baked and graphitized under atmospheric pressure using the time-temperature cycles illustrated in FIG. 1. Baking was carried out in a separate baking furnace to preserve space in the more expensive graphitizing apparatus. However, both of these steps could be carried out in a single apparatus in one cycle without cooling the baked artifact prior to graphitizing.

The thus graphitized article was subjected to a second series of impregnating, carbonizing, baking and graphitizing steps by placing it in a second stainless steel container and repeating the steps described above. This two-cycle procedure resulted in a product having the following characteristics:
Apparent Density: 2.06 g/cc
Compressive strength: 25,110 psi
Flexural strength: 9,600 psi
Electrical resistivity: 5.5 ohm-inch×$10^{-4}$
Coefficient of thermal expansion: 7.0 inches/inches/°C.×$10^{-6}$
Shore Hardness: 63
Isotropic ratio: 1.03

This operation was sufficient to occupy 65.5 percent of the total porosity and 69 percent of the open porosity with graphite determined by density gain. The homogeneity of this article is evidenced by the photomicrograph reproduced in FIG. 2 taken at 100 diameters magnification. These results illustrate that the fine-grained, homogeneous, fine-pored graphite having a high ratio of open to closed porosity can be effectively densified in only 2 cycles from the original value of 1.68 g/cc to a density of over 2 g/cc.

EXAMPLE 2

The two-cycle operation described in Example 1 was repeated using a machined rectangular graphite preform 2"×4"×6" having the following characteristics:
Average particle size: 2 microns
Average pore diameter: 0.9 microns
Apparent density: 1.85 g/cc
Compressive strength: 24,000 psi
Flexural strength: 14,000 psi
Electrical resistivity: 5.75 (ohm-inch×$10^{-4}$)
Coefficient of thermal expansion: 7.7 (Room temp. to 100° C.×$10^{-6}$ inch/inch/°C.)
Shore hardness: 78
Isotropic ratio: 1.03

This material had a total porosity of 17 percent, and an open porosity of 85 percent corresponding to 14 percent of the total. It is available from Poco Graphite, Inc. at the address given above as grade AXF-5Q.

Two cycles identical to those described in Example 1 were sufficient to convert this material to a strong, densified article having the following characteristics:
Apparent density: 2.10 g/cc
Compressive strength: 31,000 psi
Flexural strength: 18,000 psi
Electrical resistivity: 5.0 (ohm-inch×$10^{-4}$)
Coefficient of thermal expansion: 7.2 (Room temp to 1000° C.×$10^{-6}$ inch/inch/°C.
Tensile strength: 11,000 psi
Shore hardness: 77
Isotropic ratio: 1.03

In addition to the above values the product was essentially impermeable, having a helium permeability of about $3\times10^{-3}$ cm$^2$/sec(°F.).

EXAMPLE 3

This example demonstrates the densification techniques of this invention using thermosetting polymers rather than thermoplastic pitches. The substrate was the same graphite grade described in Example 1 machined into a rectangular 2"×4"×6" blank.

The article was placed in a stainless steel can and impregnated, carbonized, baked and graphitized for two complete cycles as described in Examples 1 and 2 with the following exceptions. The impregnant was Quaker Oats QO furfuryl alcohol (97% furfuryl alcohol and 2% furfural) containing 5 weight percent phthalic anhydride catalyst. Following evacuation to 20 torr for 2 hours in the vacuum autoclave, the furfuryl alcohol-catalyst mixture was quickly introduced to the stainless steel container to a level sufficient to cover the substrate. After releasing the vacuum, the container was removed, capped, evacuated and sealed as described in Examples 1 and 2.

The impregnated article was then carbonized, baked and graphitized as described in Examples 1 and 2 with the exception that the impregnating-carbonizing pressure was brought to 12,000 psi at ambient temperature and kept at that level throughout the carbonizing cycle. After two complete cycles a dense, isotropic article was obtained having the following characteristics:

Apparent density: 2.06 g/cc
Compressive strength: 39,000 psi
Flexural strength: 24,000 psi
Electrical resistivity: 6.0 (ohm-inch $\times 10^{-4}$)
Coefficient of thermal expansion: 7.0 (Room temp. to 100° C. $\times 10^{-6}$ inch/inch/°C.
Tensile strength: 13,000 psi
Shore hardness: 87
Isotropic ratio: 1.03

EXAMPLE 4

This example illustrates the manner in which the concepts of one alternative embodiment of this invention could be applied to the densification of isotropic graphite artifacts. The substrate described in Example 1 would be subjected to the impregnation cycle there described by placing it in a stainless steel container within a vacuum autoclave, drawing a vacuum of 20 torr for 2 hours, introducing a highly fluid pitch impregnant such as Ashland 240 pitch at a temperature of 250° C., and then returning the pressure to atmospheric. The article can then be removed from the container and excess impregnant and placed directly into a hot wall autoclave and pressured to 12,000 psi with argon and carbonized by using the heating cycle described in Example 1. Baking and graphitizing cycles of FIG. 1 can be employed.

The article can be subjected to elevated pressures, i.e., up to about 25,000 psi during the earlier stages of the graphitizing cycle during which temperatures are below 1800° C. It is also possible to assure further density increase by maintaining the pressure on artifacts not surrounded by excess impregnant, with a carbonizable gas such as methane, ethylene and the like.

EXAMPLE 5

This example illustrates an alternative embodiment involving a two-cycle process in which the first cycle carbonizing step is carried out under atmospheric pressure to minimize the risk of article fracturing. While pressure carbonizing as described hereinabove is preferred to accomplish the greatest density increase with a minimum number of process cycles, the operator, by pressing for the greatest possible density gain in the first process cycle also increases the possibility of product failure by fracturing. This fracturing generally occurs during the baking and/or graphitizing steps of either the first or second cycles and—without intending to be held to any particular theory—is apparently associated with the entrapment of unevacuated gas or impregnant thermal decomposition products within the matrix due to pore plugging. We have found that this type of failure can be reduced with a multicycle process in which the first cycle carbonizing step is carried out under atmospheric pressure.

Accordingly, a graphite substrate having the properties described in Example 2 including a total porosity of 17 percent of which 85 percent is open porosity (14 percent open porosity, absolute) can be evacuated, impregnated with Ashland 240 petroleum pitch at 225° C. and carbonized in the presence of excess impregnant as described in Example 1. In this case, however, carbonizing is effected by gradually heating the impregnant-containing substrate to a temperature of 700° C., e.g., over a period of 10 hours, and holding at that temperature for an additional 10 hours. Following this atmospheric carbonizing step, the article is removed from the stainless steel container, cleaned of excess surface carbon (with mild surface machining if preferred to further open surface porosity), baked and graphitized as described in Example 1. The full cycle of impregnation, carbonizing, baking and graphitizing can be repeated under the conditions described in Example 1 employing the pressure-carbonizing conditions detailed therein.

This procedure results in the formation of a densified graphite article having a density above 2.0, improved strength properties in all respects, and an isotropic ratio of 1.05 or less.

EXAMPLE 6

This example illustrates a single cycle in which a substrate is densified to a level above 2.0 g/cc in one impregnation-graphitizing cycle. This approach is preferable from the standpoint of economics but, as pointed out in Example 5, increases the risk of product failure by fracturing during baking or graphitizing due to gas entrapment within the article interior. The probability of such failure can be reduced by using gradual heat-up rates during both the baking and graphitizing steps such as the heating cycles illustrated in FIG. 1. Even more gradual heat-up rates than those illustrated in the FIG. 1 will further reduce the possibility of article failure by this mechanism.

A graphite substrate having an apparent density of 1.85 g/cc and the other properties for the substrate described in Example 2 can be impregnated with Ashland 240 petroleum pitch at 250° C. by first placing the substrate in a stainless steel can, braising a top onto the can (as described in Example 1), drawing a vacuum of 20 torr on the article, maintaining that vacuum for 2 hours, and then introducing hot pitch in an amount sufficient to cover the article. The pressure is then returned to atmospheric.

The article is pressure carbonized in the sealed container by pressuring to 300 psi in a pressure autoclave while increasing temperature to 200° C. and then rapidly increasing pressure along with temperature to reach 15,000 psi at 290° C. Temperature is then gradually increased to 700° C. while maintaining 15,000 psi on the article which is retained under these conditions for at least 10 hours. The steel container is then removed from the autoclave and allowed to cool. The carbonized substrate is removed from the container, freed of excess surface carbon, and baked and graphitized by the schedules illustrated in FIG. 1.

Numerous variations and modifications of the concepts of this invention will be apparent to one skilled in the art in view of the foregoing disclosure, examples and the appended claims. For instance, the articles can be wetted with minor amounts of surfactants prior to impregnation to improve impregnant penetration. Similarly, the impregnated articles could be removed from excess impregnant prior to carbonization to avoid the additional steps and difficulty in removing excess pyrolyzed impregnant from the carbonized articles. This factor may be particularly attractive when using polymeric impregnants which are more difficult to remove from the graphite surface.

We claim:

1. The method of producing a homogeneous, isotropic, graphite article having a density of at least about 2 g/cc, a compressive strength of at least about 20,000 psi, a flexural strength of at least about 8,000 psi, and an isotropic ratio of about 1.05 or less, by the steps comprising
   (a) reducing, to 100 mm mercury or less, the pressure on a homogeneous, isotropic graphite substrate having
      (1) a density of about 1.6 to about 1.95 g/cc;
      (2) an isotropic ratio of about 1.05 or less;
      (3) at least about 15 percent total porosity;
      (4) at least about 50 percent of said total porosity being open porosity contained in interconnected pores open to the surface of said substrate and having an average pore size of about 5 microns or less and a narrow pore size distribution in which at least 90 percent of said open porosity is contained in pores having diameters of less than about 20 microns;
   (b) covering said substrate while under said reduced pressure with a fluid, carbonizable impregnant selected from (1) phenolic and furfural alcohol resins, and (2) petroleum and coal tar pitches having melting points of about 200° C. or less, carbon/hydrogen atom ratios of at least about 1.6, carbon residue values of at least about 60 percent, and less than about 20 weight percent benzene insolubles, at a temperature of at least about 20° C. above the melting point of said impregnant;
   (c) impregnating said substrate and carbonizing said impregnant within said substrate by (1) pressurizing said substrate, while covered with said impregnant, up to a pressure of at least about 10,000 psi and less than about 30,000 psi, (2) heating said substrate up to a temperature of at least about 600° C. correlated with said pressure to maintain the combination of said impregnant and substrate at a pressure of at least about 10,000 psi and less than about 30,000 psi and a temperature of at least about 600° C. for a period of time sufficient to impregnate at least about 80% of said open porosity with said impregnant and carbonize said impregnant within said open porosity; and
   (d) graphitizing the resulting carbonized, impregnated substrate by heating it to a temperature of at least about 2400° C., said impregnating, carbonizing and graphitizing steps being conducted at pressures below about 30,000 psi and under pressures correlated with temperatures so that at temperatures above 1800° C. said graphite substrate is not exposed to any substantial pressure capable of increasing said isotropic ratio.

2. The method of claim 1 wherein said graphite substrate is converted to said graphite article having a density of at least about 2 g/cc within two or less cycles of impregnation, carbonization and graphitization.

3. The method of claim 2 wherein said impregnant is selected from the group consisting of petroleum and coal tar pitches having carbon residues of at least about 65 percent under the carbonizing conditions hereinafter defined, said substrate has an initial density of about 1.75 to about 1.95, total porosity of at least about 25 percent, a pore size distribution such that at least about 90 percent of said total porosity is contained in pores having diameters of less than about 10 microns; said substrate is impregnated and carbonized at a temperature and pressure sufficient to carbonize at least about 65 weight percent of said impregnant within said substrate, and the resultant carbonized substrate is graphitized at a temperature of at least about 2500° C., said graphitizing temperature being maintained for a period of time sufficient to convert essentially all of the carbon contained therein derived from said impregnant to synthetic polycrystalline graphite.

4. The method of claim 3 wherein said substrate is impregnated and carbonized at a maximum pressure of at least 10,000 psi correlated with temperature to carbonize at least about 70 weight percent of said impregnant within said graphite body and increase the apparent density of said graphite body to a level of at least about 2 g/cc within one impregnating-graphitizing cycle.

5. The method of claim 3 wherein said impregnant has a carbon/hydrogen ratio of at least about 1.65, and said temperatures and pressures of said impregnating and carbonizing steps are sufficient to impregnate at least about 95 percent of said open porosity with said impregnant and to carbonize at least about 70 weight percent of said impregnant within said pores, and increase the density of said graphite article to a level of at least about 2.1 grams per cc within two or less impregnating-graphitizing cycles.

6. The method of claim 1 wherein said graphite article is not exposed to a pressure of more than 100 psi at any temperature above about 1800° C.

7. The method of claim 1 wherein said graphite substrate is subjected to at least two impregnating-graphitizing cycles, in the first cycle of which said impregnated substrate is carbonized at a maximum pressure below 500 psi and in a subsequent cycle is carbonized at a maximum pressure of at least about 10,000 psi.

* * * * *